Sept. 1, 1931.  W. A. BAUM  1,821,902
MANOMETER
Filed March 9, 1927  3 Sheets-Sheet 1

INVENTOR.
William A. Baum
BY
Dorsey & Cole
ATTORNEYS

Sept. 1, 1931.  W. A. BAUM  1,821,902
MANOMETER
Filed March 9, 1927   3 Sheets-Sheet 3

INVENTOR.
William A. Baum
BY
Dorsey & Cole
ATTORNEYS

Patented Sept. 1, 1931

1,821,902

UNITED STATES PATENT OFFICE

WILLIAM A. BAUM, OF NEW YORK, N. Y., ASSIGNOR TO W. A. BAUM CO. INC., OF NEW YORK, N. Y., A CORPORATION OF NEW YORK

MANOMETER

Application filed March 9, 1927. Serial No. 174,022.

This invention relates to manometers for the measurement of pressure or vacua in fluids, or of differences in pressure or in vacua between several points in fluid systems.

More particularly the invention relates to an improvement in so-called sphygmomanometers, or apparatus for the indirect determination of blood pressure, of the general type disclosed in my Patent No. 1,594,039.

One of the principal objects of my present invention is to provide an instrument in which the mercury reservoir is of metal and the measuring tube is of glass, and in which the latter, instead of having a sealed connection with the reservoir as has heretofore been the practice in the art, is readily removable therefrom, but at the same time maintains a mercury tight joint therewith when mounted in position. In my present instrument the use of cement is entirely done away with.

Another object of the present invention is to provide an instrument in which the measuring tube is accurately interchangeable with another tube, that is to say, when the second tube is mounted in place of the first, readings exactly as accurate as those of the first will be obtained, so that if breakage of the tube supplied with the instrument should occur, it will only be necessary for the user to obtain from the manufacturer and substitute another tube in place of the broken one, which substituted tube will give readings exactly as accurate as the tube which was broken.

Another object of my present invention is to provide novel means for mounting the glass measuring tube in such a way that it will be protected against accidental fractures or breakage.

Another object of the present invention is to provide a construction in which the cap which covers the upper end of the measuring tube and which carries the means to permit the flow of air in the measuring tube above the measuring fluid, and at the same time dampen fluctuations of the measuring fluid, is carried on a part separate from the tube, and is mounted independently of the tube, rather than being mounted directly thereon.

A further object of the invention is to provide an instrument in which the mercury, instead of being transported when the instrument is in transit, in a separate container as has heretofore been the custom, may be transported in the instrument itself.

Another of the objects of the invention is to provide a mounting for the tube such as will allow the tube to be removed from the instrument and replaced without the use of any tools whatsoever, and which at the same time will apply a constant axial pressure to the tube when mounted in position, for maintaining mercury tight connections with the reservoir and the cap.

The many advantages flowing from these, and other objects of the invention, will be more particularly referred to as the specification proceeds.

General assembly

The general assembly of the instrument, in addition to the box 5 and its cover 6, and the arm band and hose connections indicated generally at 7, includes the supporting plate 8, fixed to the inner face of the cover 6 by screws or other suitable connections 9; the rod 10 riveted to the supporting plate as at 11 and on which the fixture 12 is carried by the screw as at 13; the metal mercury reservoir 14; the slide 15 which is carried by and is slidable longitudinally of the supporting plate 8; the spring 16, which constantly biases the slide toward the fixture; the measuring tube 17 which is interposed between and engaged at its ends in the socket 18 of the fixture, and the cap 19 of the slide; and the scale plate 20, which is mounted on the supporting plate beneath the measuring tube, and which covers the face of the supporting plate and conceals the parts carried thereby. The scale plate may be made of celluloid or other suitable material, and sprung into place between the side flanges of the supporting plate, later referred to, and is longitudinally indented to accommodate the tube, and to position the numerals on the scale plate substantially opposite the center of the tube.

Supporting plate, supporting rod and fixture

The supporting plate is made of a strip of metal of suitable gauge and of the proper length and width, and has its edges overturned or flanged as at 21 to engage the edges of the scale plate 20 for retaining the latter in position. The upper end of the supporting plate is flanged over as at 22 for engaging over the upper edge of the scale plate. These flanged portions, in addition to the function of supporting the scale plate, of course add considerable rigidity and strength to the supporting plate. The supporting rod 10 is arranged at the lower end of the scale plate, projects for a distance below the edge thereof, and is arranged beneath the scale plate and hence obscured from view by the latter. To this rod the fixture 12 is held by the screw 13, a recess 23 being formed in the rear face of the fixture, into which the rod fits for preventing relative movement of the fixture and rod when the screw is turned home. The fixture, which is provided with a duct 24, supports on one side the mercury reservoir 14 and on the other side is equipped with the socket 18 for receiving the lower end of the measuring tube, the duct affording communication between the reservoir and the measuring tube.

Slide assembly

The slide 15 bears against the forward face of the supporting plate, and is guided through a slot 25 formed in the upper overturned flange 22 thereof, the lower portions of the slide being guided by the lugs 26 which are struck up from the metal of the plate and turned over to overhang the forward face of the slide. Thus the latter is confined to a linear movement longitudinally of the supporting plate, and toward and away from the socketed portion 18 of the fixture. The retractile spring 16, which at one end is anchored to the plate as at 27, and at the other end is connected to the slide as at 28, constantly urges the slide downwardly and toward the fixture. The upper end of the slide is overturned as at 29, and this portion is beveled off along one side as at 30, leaving on the other side, and in alignment with the spring 16, an area of metal as at 31, which affords a thumb piece that may be engaged by the operator in retracting the slide against the tension of the spring when it is desired to remove the tube. It will be observed that the slide, except for the upper overturned portion thereof, the guide lugs 26 and the spring 16 and the anchorages for the latter, are disposed beneath the scale plate, and hence hidden from observation by the latter.

The cap

The cap, indicated generally at 19, includes an externally threaded bushing 32, which extends through the upper overturned end 29 of the slide, and is swaged over or riveted to the lower face thereof as at 33, into which bushing the upper end of the tube 17 extends. The bushing is pierced as at 34, to afford a continuation of the bore of the tube, and over the bushing and between it and a cap piece 35 is arranged the disk 36 of barometer kid, or other means having the characteristic of permitting the flow of air in the measuring tube above the fluid and at the same time dampening the fluctuations of the measuring fluid, as set out more particularly in my prior patent. The cap piece has its lower flanged portion interiorly threaded so that it may be screwed on to the bushing, to clamp the disk or other means in place thereon, and to provide a mercury tight joint between these parts. It will be observed that in my present construction the upper end of the measuring tube is removable from the cap which closes it, such cap being carried by the slide, thus rendering unnecessary the provision of means on the tube itself onto which the cap might be screwed or cemented or otherwise secured as heretofore.

The measuring tube and scale

The measuring tube is made of glass selected to fall within standard dimensions of bore, and is calibrated while coupled up with a master or standard calibrating reservoir, the graduations being marked on the tube as at 37, every fifth graduation being longer than the intermediate ones. The reservoir of each instrument conforms in interior dimensions with the standard or calibrating reservoir. The numbers referring to every fifth graduation line, or ten millimeter reading, are separated from the graduation marks, and are located on the scale plate, on opposite sides of the reading tube, as will be observed from the drawings. By reason of the above arrangement, and since every measuring tube is calibrated, it will be seen that if a breakage of the glass tube should occur, it will only be necessary for the user to substitute another calibrated tube, which will give readings exactly as accurate as the tube which was broken. By so standardizing one of the two variable factors in the calibration, (the reservoir) it becomes necessary to control only by selection the bore of the glass tubes used within reasonable manufacturing limits, so that in every case every fifth graduation line will come so close to the center of its designating number on the scale plate that there will be no possible confusion on the part of the operator as to the reading of the column of mercury wherever it may stand.

At its ends the tube is reduced exteriorly as at 38, forming shoulders 39 at a standard distance from each end of the tube, and upon the reduced ends of the tube are secured the shock-absorbing bands 40 of a standard diameter, such bands being located preferably slightly inwardly from the ends of the tube. When the tube is in place on the instrument, these bands are located respectively within the bushing 32 of the cap and the socketed portion 18 of the fixture, and serve the purpose of absorbing radial shocks and jars which might tend to break or crack the tube. I have found that celluloid bands shrunk onto the reduced portions of the tube adequately serve the purpose of absorbing shocks and jars, even of severity, but I do not intend to limit myself to the mounting of the bands on the tube itself, or to the use of celluloid, or to the process of shrinking for securing the bands in place, as other materials, and other methods of mounting of the bands, may prove to be of use.

The external diameter of the bands is sufficiently less than the internal diameter of the socket and cap to allow a lateral swinging movement of the end of the tube opposite the socket or cap during the removal or insertion of the tube, as will hereinafter appear. I prefer to have the bands at the opposite ends of the tube of different colors, such for instance, as red for the lower band and white for the upper, for the purpose of reminding the operator to always replace the tube in the same position it occupied while being calibrated. Otherwise an operator might reverse a tube when placing it in the instrument with a resultant possibility of inaccuracy of indication. I also prefer to provide a marker such as a dot $a$, of a contrasting color, say white, in the lower band in line with the center of the graduation marks, so that this dot or marker may be alined with a notch $b$ cut in the front of the socket to thereby position the tube with the graduations to the front. The desirability of aligning the marker and slot acts as a further reminder to replace the tube with the proper end down.

Tube assembly

The tube, when assembled in operative position on the instrument, bears at its lower end against a compressible gasket 41 carried in the socketed portion 18 of the fixture, and at its upper end against a similar gasket 41$^a$ carried in the bushing 32 of the cap, and the pressure exerted by the slide axially of the tube compacts the gaskets between the reduced extensions of the tube ends and the floors of the socket and bushing, respectively, thus maintaining mercury tight connections at these points, and the pressure exerted by the slide will maintain these connections against blows or stresses longitudinally of the tube which might tend to force the tube away from or out of engagement with the gaskets. At the same time the resilient mounting of the slide cushions the tube against severe blows or stresses and prevents breakage thereof. I have found that thin gaskets made of cork will serve the purpose of forming a tight joint under the pressure of the slide, and of absorbing sudden shocks or blows axially of the tube, but I do not intend to limit myself to such material, as others may be found to be of use.

Shipping assembly

Figure 8:
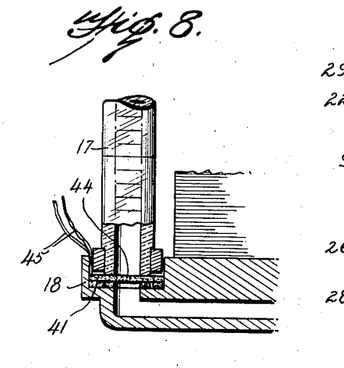
Figure 8 represents a view similar to Figure 4, showing the position of the obstruction disk for sealing the mercury in the reservoir while the instrument is in transit.
Figure 9:
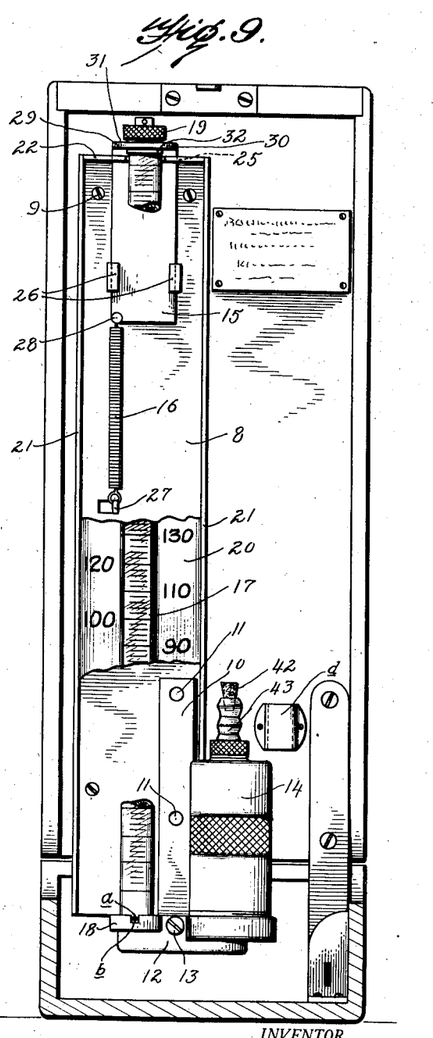
Figure 9 represents an elevational view, partly in section, and parts being broken away, showing the slide and its associated parts, and showing the location of the cork which seals the mercury trap when the instrument is in transit.

When the instrument is in condition for shipping, the mercury is contained within the reservoir, and a small cork or other closure 42, (see Fig. 9) is utilized to prevent circulation of air in the reservoir through the trap 43. In order to confine the mercury in the reservoir and prevent circulation of air thereto through the fixture, a thin disk of cork, or other suitable material, 44, (see Fig. 8) is interpositioned between the lower end of the measuring tube and the gasket 41, and forms an obstruction to the flow of mercury and air. The disk may have connected thereto a string 45 whereby it may be removed from the socket, after the tube is removed, and such string may extend out between the band on the tube and the socket in position to be readily grasped when the tube is removed. While the disk is in position the pressure exerted by the spring pressed slide maintains a tight joint between the disk and the gasket, and the gasket and socket, sufficient to prevent the escape of mercury, and to prevent the ingress and egress of air relative to the fixture, thus while trapping the mercury in the reservoir, at the same time preventing the circulation of air therein, to thereby prevent oxidization of the mercury while the instrument is in transit or is in storage.

Operation

Figures 3, 4, 5, 6, 7:
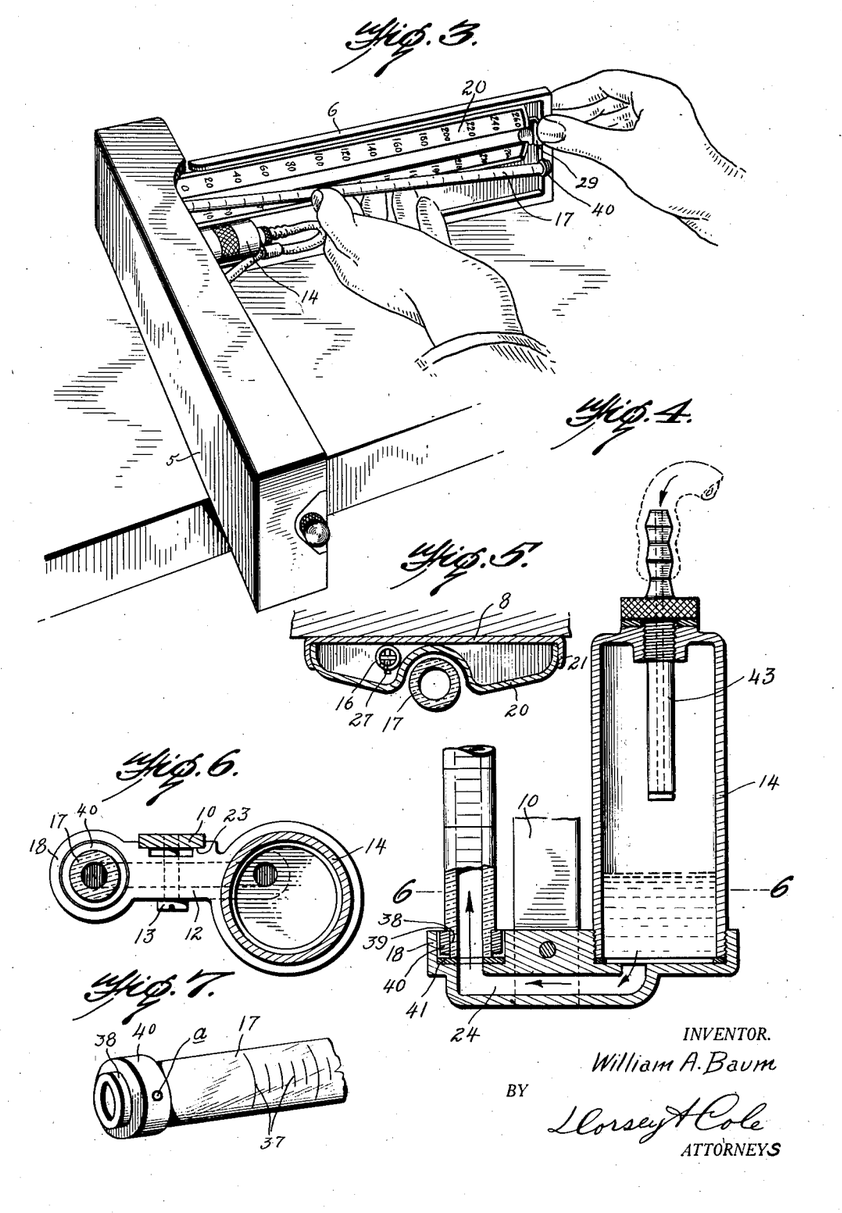
Figure 3 represents a view in perspective of the instrument, turned over on its side, showing one of the positions of the parts during the removal of the measuring tube.
Figure 4 represents an enlarged fragmentary vertical sectional view of the lower portion of the instrument.
Figure 5 represents an enlarged fragmentary horizontal section on the line 5—5 of Figure 1.
Figure 6 represents a sectional view on the line 6—6 of Figure 4.
Figure 7 represents an enlarged fragmentary perspective view of the lower end of the measuring tube.

The instrument having been received by the user in the condition above described, when it is desired to put the instrument in condition for operation, the cover of the box is opened, and the instrument turned over on its right side, i. e., with the reservoir below the tube, and the operator then holding his left hand against the lower side of the scale, below the tube, places the right thumb on the thumb piece with the fingers bearing against the end of the cover. Then by moving the thumb piece outwardly or to the right, by forcing the thumb and fingers of the right hand toward each other, the cap will be moved outwardly with respect to the tube and the tube will drop into the left hand, as illustrated in Figure 3. The pressure on the thumb piece is then released to allow the cap to move to its normal position. The end of the tube is then removed from the socket, and the disk is removed by pulling upon the string. This position of the instrument, it will be noted, retains the mercury in the reservoir, so that none of it will escape when the obstructing disk is removed. The operation of placing the instrument in condition for use is continued by holding the tube in the left hand at an angle of about 15° to the scale, and, with the graduation marks facing toward the operator, inserting the end of the tube having the white band into the cap. The thumb piece is then moved outwardly while the tube is kept in engagement with the cap, then the tube is swung inwardly toward the scale until the end carrying the lower or red band is opposite the fixture socket, with the marking or dot in line with the slot in the lower socket. The pressure upon the thumb piece is then slowly released while the left hand guides the end of the tube into the lower socket. Then by pressing on the cap the ends of the tube may be firmly seated against the gaskets.

The instrument may then be turned to an upright position and the mercury will flow into the tube from the reservoir. The stopper 42, is then removed from the nozzle of the trap, and the end of the rubber tube c, leading from the arm band e, is slipped well down over the nozzle, whereupon the instrument is ready for use.

The rubber tube c, it will be noted, extends near the end which connects with the reservoir, beneath the clamp d. The latter is carried by the cover 6 of the box and is located just to the right of the end of the trap, and thus confines the adjacent portion of the tube against movement with the result that pulls and stresses on the tube will be taken up at the clamp, and will thereby be prevented from dislodging the tube end from the trap, and further the tube will be confined against swinging movements which might at times interfere with perfect vision of the scale or measuring tube. This arrangement presents a further improvement over the method of leaving the tube free, in that by confining the long rubber tube near its end, the packing away of the arm-band, and the bulb and tubing when closing the instrument, is greatly facilitated.

The correct amount of mercury, of course, will be contained in the instrument when it is shipped. If any of it should accidentally be spilled while placing the instrument in condition for operation as above described, the correct amount may be added by placing the instrument in an upright position on a level surface, unscrewing the cap piece 35, and pouring enough mercury into the tube to bring the ring of the meniscus even with the zero line on the measuring tube, the eye being kept on a level with the zero line when judging this. The cap piece may then be firmly screwed onto the bushing 32 with the thumb and fingers.

Modified form

Figures 1, 2:
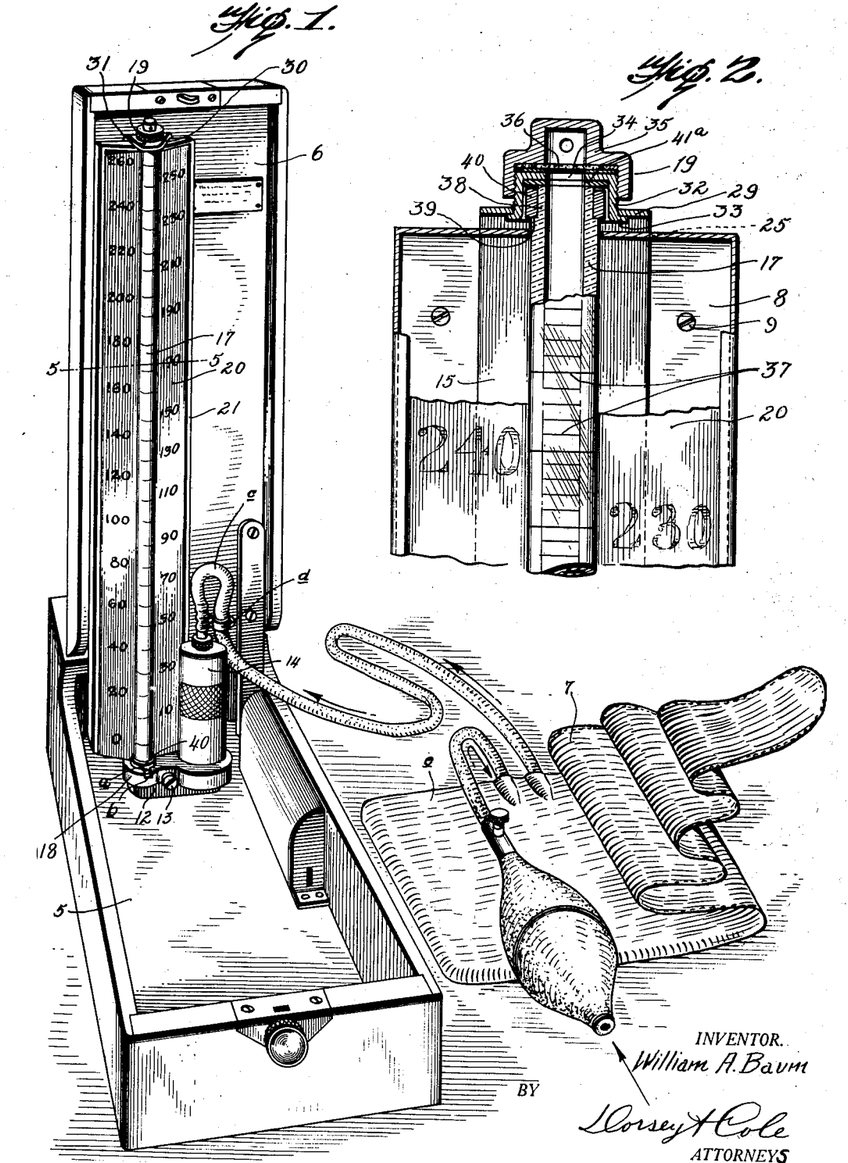
Figure 1 represents a view in perspective of the instrument in its normal operative condition.
Figure 2 represents an enlarged fragmentary vertical sectional view of the upper portion of the instrument.
Figure 10:
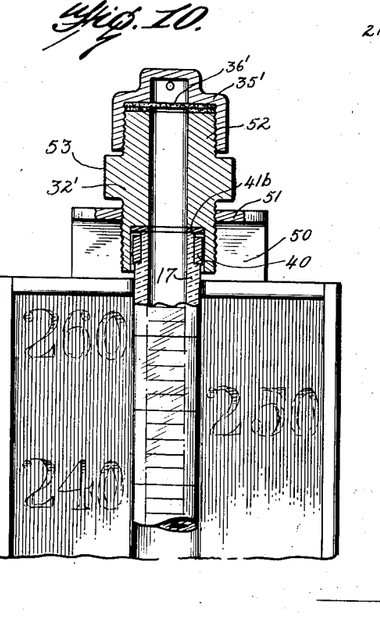
Figure 10 represents an enlarged fragmentary vertical sectional view of the upper portion of a modified form of instrument.

In a modified form of the invention, a metallic extension 50 of the supporting plate, has an overturned end 51, through a threaded opening in which the lower threaded end of a bushing 32' is screwed, such bushing carrying a gasket 41ᵇ against which the upper end of the tube will engage. Onto the upper threaded end 52 of the bushing is screwed the cap piece 35', equipped with the means illustrated at 36' having the characteristics of permitting the flow of air in the measuring tube above the fluid and at the same time dampening the fluctuations of the measuring fluid. The bushing 32' may be provided with a knurled shoulder portion 53, which may be grasped by the thumb and fingers of the operator to screw the bushing downwardly through the overturned portion 51, or to unscrew it upwardly with respect thereto. In this form of the invention, the resiliency of the metal flange 51, if such flange is made of resilient material, is taken advantage of to exert a constant pressure axially of the measuring tube when the bushing is firmly screwed down onto the upper end of the tube, and such resilient pressure, it has been found, maintains mercury tight joints at the ends of the tube, even against severe axial stresses tending to force the tube away from or out of engagement with the gaskets, and like the spring-pressed slide form, adequately absorbs the axial stress which would tend to break or fracture the tube. The tube shown in this form of the invention is similar to the tube shown in Fig. 1, and is similarly calibrated, and is interchangeable therewith in accordance with one of the objects of the invention above set forth.

Conclusion

I have found, in the commercial instruments made according to this invention, that the instruments will stand a remarkable amount of abuse without breaking or fracturing the tubes, and that stresses and strains both radially and axially of the tube are absorbed to a very high degree and that the percentage of breakage occuring in transit, or in the use of the instruments in the hands of the owner is extremely low. The removable tube feature of the instrument allows of the tube being readily removed without the use of any instruments, for cleaning purposes, and allows of the ready replacement of a broken tube by a new one, by the user himself, and without the necessity of shipping the entire instrument to the factory. The feature of the invention whereby the mercury may be shipped in the instrument itself, in a sealed condition, is of importance, when it is understood that the common practice in the art heretofore has been to ship the mercury in a separate glass container, which often became broken, and was attended by the further disadvantage that the mercury had to be poured into the instrument by the user, with the result that it was often partially spilled or lost, and the instrument used with a less amount of mercury than that for which it was designed, with of course a consequent error in the reading of the instrument.

The foregoing detailed description has been given for purposes of clearness of understanding, and no undue limitations should be deduced therefrom, but the appended claims should be construed as broadly as permissible in view of the prior art.

What I claim and desire to secure by Letters Patent is:—

1. In a manometer, the combination of a supporting plate, a fixture carried thereby, a liquid reservoir with which the fixture communicates, a measuring tube having one end detachably connected with the fixture, a slide slidably carried by the supporting plate, means constantly biasing the slide toward the fixture, a cap carried by the slide detachably engaging the other end of the tube and tending to compress such tube between the fixture and cap, and a scale plate interposed between the tube and the supporting plate and overlying the slide.

2. In a manometer, the combination of a supporting plate, a liquid reservoir carried thereby, a fixture communicating with the liquid reservoir, a measuring tube having one end detachably connected with the fixture, a slide slidably carried by the supporting plate, means constantly biasing the slide toward the fixture, and a cap independent of and disconnected from the reservoir and supported by the slide, said cap detachably engaging the other end of the tube and tending to compress such tube between the fixture and cap.

3. In a manometer, the combination of a supporting plate, a reservoir carried thereby, a measuring tube, means with which the measuring tube is detachably connected at one end affording communication between the measuring tube and reservoir, a slide slidably carried by the supporting plate, a cap disconnected from and independent of the reservoir and supported by the slide, said cap detachably engaging the opposite end of the tube, and a spring operatively connected with the slide and causing the cap to exert pressure axially on the tube.

4. In a sphygmomanometer, the combination of a measuring liquid, a reservoir for containing the measuring liquid, a fixture affording communication with the reservoir, a cap disconnected from and independent of the reservoir and affording communication with atmosphere, means on which the cap is mounted whereby the cap may be biased toward the fixture, gaskets carried by the fixture and cap, and a measuring tube detachably interposed between and loosely fitting the fixture and cap and compressing the gaskets at its ends.

5. In a sphygmomanometer, the combination of a measuring liquid, a reservoir for containing the measuring liquid, a fixture affording communication with the reservoir, a cap independent of and disconnected from the reservoir affording communication with atmosphere and movable toward and away from the fixture, means supporting the cap whereby it may be moved toward and away from the fixture, and a measuring tube detachably interposed between the fixture and cap and adapted to be held in position by the latter.

6. In a sphygmomanometer, the combination of a measuring liquid, a reservoir standardized as to its internal diameter for containing the measuring liquid, a measuring tube, means with which the measuring tube is removably connected affording communication between the tube and the reservoir, said measuring tube being calibrated with reference to the standardized reservoir, and means independent of and disconnected from the reservoir having a detachable connection with the other end of the tube connecting the tube with atmosphere and maintaining under pressure the connection between the tube and reservoir.

7. In a sphygmomanometer, the combination of a measuring liquid, a reservoir for containing the measuring liquid, such reservoir being standardized with respect to its essential interior dimensions and having a communicating fixture, a measuring tube loosely connected at one end with the fixture, such tube being calibrated for accurate reading in respect to the reservoir and being interchangeable with another measuring tube, a cap in which the other end of the tube is loosely mounted and connecting that end of the tube with atmosphere, such cap being disconnected from the reservoir and being mounted for movement toward the fixture, washers at the end of the tube, and means including the cap for applying constant axial pressure to the tube when mounted in position.

8. In a manometer, the combination of a reservoir, a fixture affording communication with the reservoir, a cap, means whereby the cap may be biased toward the fixture, a tube detachably interposed between the fixture and cap, and shock absorption bands mounted on the tube and disposed between the same and the adjacent walls of the fixture and cap.

9. In a manometer, the combination of a reservoir, a fixture affording communication with the reservoir, a washer carried in the fixture, a tube detachably connected with the fixture and bearing against the washer, and a shock absorption band mounted on the tube and disposed between the same and the adjacent wall of the fixture.

10. In a manometer, the combination of a reservoir, a fixture affording communication with the reservoir, a cap independent of and disconnected from the reservoir, a tube detachably interposed between the fixture and cap, and means between the tube and the fixture and cap for absorbing stresses exerted radially and axially of the tube.

11. In a manometer, the combination of a supporting plate having spaced flanges, a measuring tube, and a numbered scale plate carried by the supporting plate and underlying the measuring tube and indented for the reception of the latter, the edges of the scale plate being sprung between and engaging said flanges.

12. In a manometer, a measuring tube having a reduced end forming a shoulder, and a shock absorption band shrunk on the reduced end and abutting the shoulder.

13. In a manometer, a measuring tube having a celluloid shock absorption band shrunk thereon.

14. In a manometer, the combination of a reservoir, a fixture communicating with the reservoir, a measuring tube communicating with the fixture and detachable with respect thereto, and an obstruction blocking communication between the fixture and tube and retained in place by such tube, such obstruction being removable when the tube is removed to thereby allow communication between the tube and reservoir when the tube is replaced.

15. In a manometer, the combination of a fixture affording communication with a reservoir, a tube detachably mounted in the fixture, an obstruction blocking communication between the reservoir and tube and retained in place by such tube, such obstruction being removable when the tube is removed whereby communication between the tube and reservoir is established when the tube is replaced, and means carried by the obstruction for removing the same.

16. In a manometer, the combination of a reservoir, a measuring liquid, a measuring tube for the measuring liquid removable with respect to the reservoir, and an obstruction excluding the measuring liquid from the measuring tube, such obstruction being removable when the tube is removed so that the liquid may enter the measuring tube when the latter has been replaced.

17. In a sphygmomanometer, the combination of a reservoir, a measuring liquid contained in the reservoir, a measuring tube, a fixture affording communication between the measuring tube and the reservoir, such tube being movable and having a detachable connection with the fixture, means, including a cap disconnected from and independent of the reservoir exerting pressure on the tube, for effecting a liquid tight joint between the tube and the fixture, and means associated with the cap and disassembled from the tube for preventing the escape of the measuring liquid from the tube when the latter is in place in the instrument and permitting the flow of air in the measuring tube above the measuring liquid.

18. In a sphygmomanometer, the combination of a reservoir, a fixture connected with the reservoir, a tube detachably connected with the fixture, a measuring liquid contained in the reservoir, means associated with the measuring tube for preventing the escape of the measuring liquid therefrom and permitting the flow of air in the measuring tube above the measuring liquid, and means adapted to exert pressure on the tube toward the fixture tending to effect a liquid tight joint therebetween, and stress absorbing means between the tube and the fixture.

19. In a sphygmomanometer, the combination of a reservoir, a removable measuring tube, a fixture affording communication between the reservoir and tube, a measuring liquid contained in the reservoir, means associated with the measuring tube for preventing the escape of measuring liquid therefrom and permitting the flow of air in the measuring tube above the measuring liquid, means exerting pressure on the tube toward the fixture, and means between the tube and fixture absorbing stresses exerted axially and radially of the tube.

20. In a sphygmomanometer, the combination of a reservoir standardized in respect to its interior diameter, a measuring liquid, a measuring tube for the measuring liquid calibrated with respect to the said standardized reservoir, such tube constantly communicating with atmosphere during normal operation of the instrument, means affording communication between the tube and reservoir and with reference to which the tube is detachably connected for interchanging with another tube, means whereby when the tube is placed under pressure a liquid tight connection will be made between the reservoir and tube, and means independent of and disconnected from the reservoir for placing the tube under pressure.

21. In a sphygmomanometer, the combination of a measuring liquid, a reservoir for containing the measuring liquid having a fixture communicating therewith, such reservoir being standardized with respect to its essential interior dimensions, a removable measuring tube communicating with atmosphere at one end and with the reservoir at the other end during the normal operation of the instrument in ascertaining blood pressure, such measuring tube being calibrated with respect to the reservoir and having a detachable connection with the fixture, and means independent of and disconnected from the reservoir and supported independently of the tube exerting pressure axially on the tube to maintain the connection between the fixture and tube sufficiently tight to prevent the escape of the measuring liquid at such connection.

22. In a manometer, the combination of a measuring liquid, a reservoir for containing the liquid, such reservoir being standardized in respect to its essential interior dimensions, a measuring tube, means affording communication between the reservoir and tube and with reference to which the tube is detachably connected for interchanging with another measuring tube, said tube being calibrated for accurate reading in respect to the reservoir, means independent of and disconnected from the reservoir for placing the tube under pressure longitudinally of itself, and means whereby when the tube is placed under pressure a liquid tight connection will be made between the reservoir and the measuring tube.

23. In a manometer, the combination of a fixture, a reservoir communicating with the fixture and standardized to accord with a master calibrating reservoir, a measuring liquid contained in the reservoir, a glass tube communicating with such fixture and being removable therefrom for interchanging with another tube, such glass tube being calibrated while coupled with said master reservoir, and means independent of and disconnected from the reservoir and including a compressible member exerting pressure longitudinally on the measuring tube for maintaining the measuring tube when assembled in liquid tight connection with the reservoir and permitting ready disassembling and assembling of the measuring tube.

24. In a manometer, the combination with a reservoir including a fixture, such reservoir being characterized by having been standardized to accord with a master reservoir, a measuring liquid contained in the reservoir, a graduated measuring tube detachably engaging the fixture and communicating with the reservoir and being removable for interchanging with another tube, said measuring tube being characterized by having been calibrated from said master reservoir, and resilient means independent of and disconnected from the reservoir exerting pressure on the measuring tube to maintain the connection between the fixture and tube sufficiently tight to prevent the escape of the measuring liquid at the said connection.

25. In a manometer, the combination of a reservoir, such reservoir being characterized by being standardized in respect to its essential interior dimensions, a measuring liquid contained in the reservoir, a graduated measuring tube, means through which the tube communicates with the reservoir and with respect to which the tube is removable for interchanging with another tube, said measuring tube being characterized by having been calibrated with respect to the essential interior dimensions of said reservoir, and a movable obstruction between the measuring tube and the reservoir for preventing the flow of the measuring liquid from the reservoir to the measuring tube, communication between the tube and reservoir being established when the obstruction is removed from the manometer.

26. In a sphygmomanometer, the combination of a box for containing and carrying the sphygmomanometer, a cover for the box capable of movement to an open position with respect thereto, a metal reservoir for containing the measuring liquid, a cap capable of movement toward and away from the reservoir, said cover forming a means of support for the reservoir and cap, and a transparent measuring tube for the measuring liquid, said tube being detachably interposed between the reservoir and cap, and means cooperating with the cap for maintaining the measuring tube in liquid tight communication with the reservoir, the cap being mounted independently of the reservoir and tube.

27. In a sphygmomanometer, the combination of a reservoir standardized with respect to its interior diameter, a fixture communicating with the reservoir, a measuring liquid contained in the reservoir, a measuring tube for the measuring liquid calibrated with respect to the said standardized reservoir, such tube having a detachable connection with the fixture whereby it may be removed therefrom for interchanging with another tube, a cap independent of and disconnected from the reservoir, means whereby the cap may be moved toward and away from the fixture, such cap adapted when moved toward the fixture to place the tube under pressure to make liquid tight the connection between the fixture and tube, such cap having assembled therein a means for preventing the escape of the measuring liquid from the measuring tube and permitting the flow of air in the measuring tube above the measuring liquid.

28. In a sphygmomanometer, the combination of a reservoir standardized as to its essential interior diameter and having a communicating fixture, a measuring liquid contained in the reservoir, a measuring tube having a detachable connection with the fixture, said tube being calibrated with respect to the standardized reservoir and adapted to be removed for interchanging with another tube, a cap independent of and disconnected from the reservoir, means supporting the cap whereby the latter may be moved toward the fixture for maintaining liquid tight the connection between the tube and reservoir, and means assembled in the cap and adapted to remain therein when the tube is removed for preventing the escape of the measuring liquid from the measuring tube and permitting the flow of air in the measuring tube above the measuring liquid.

29. In a sphygmomanometer, the combination of a measuring liquid, a reservoir for containing the measuring liquid having a communicating fixture, a measuring tube having a detachable connection with the fixture at one end and adapted to be removed from the fixture, a cap, means on which the cap is mounted for movement toward and away from the reservoir, said cap adapted to maintain the connection between the reservoir and tube liquid tight, said cap when moved in a direction away from the reservoir adapted to release the tube whereby the latter may be removed, the cap being independent of the reservoir and being mounted independently of the tube and reservoir and having assembled therewith a means to permit the flow of air in the measuring tube above the measuring liquid and at the same time dampen the fluctuations of the measuring liquid.

30. In a manometer, the combination of a reservoir having a fixture communicating therewith, a measuring tube having one end detachably communicating with the fixture, a cap independent of and disconnected from the reservoir and movable toward and away from the fixture for normally detachably holding the tube in communication with the fixture, a plate on which the cap is mounted, and a scale interposed between the tube and the plate.

31. In a manometer, the combination of a reservoir including a communicating fixture, a measuring tube detachably connected at one end with the fixture, a scale partially surrounding the tube and with reference to which the tube is removable, a cap disconnected from the reservoir, means on which the cap is mounted whereby the cap may be moved toward and away from the fixture for normally detachably holding the tube in connection therewith.

In testimony whereof I hereunto affix my signature.

WILLIAM A. BAUM.

DISCLAIMER 1,821,902.—*William A. Baum*, New York, N. Y. MANOMETER. Patent dated September 1, 1931. Disclaimer filed February 15, 1939, by the assignee, *W. A. Baum Co., Inc.*

Hereby enters this disclaimer to claims 5, 6, 7, 9, 10, 14, 15, 16, 17, 18, 19, 20, 21, 22, 23, 25, 26, 27, 28, 29, and 31 in said specification.

[*Official Gazette March 14, 1939.*]